Jan. 25, 1966 T. H. STROM 3,231,197
EXPANSIBLE NOZZLE
Filed April 17, 1964 4 Sheets-Sheet 1

INVENTOR.
THOMAS H. STROM
BY
Erwin F. Adams
ATTORNEY

Jan. 25, 1966  T. H. STROM  3,231,197
EXPANSIBLE NOZZLE
Filed April 17, 1964  4 Sheets-Sheet 2

INVENTOR.
THOMAS H. STROM
BY Erwin F. Adams
ATTORNEY

Jan. 25, 1966 T. H. STROM 3,231,197
EXPANSIBLE NOZZLE
Filed April 17, 1964 4 Sheets-Sheet 3

INVENTOR.
THOMAS H. STROM
BY
*Erwin F. Adams*
ATTORNEY

Jan. 25, 1966  T. H. STROM  3,231,197
EXPANSIBLE NOZZLE
Filed April 17, 1964  4 Sheets-Sheet 4

INVENTOR.
THOMAS H. STROM
BY Erwin F. Adams
ATTORNEY

United States Patent Office 3,231,197
Patented Jan. 25, 1966

3,231,197
EXPANSIBLE NOZZLE
Thomas H. Strom, Seattle, Wash., assignor to The Boeing Company, Seattle, Wash., a corporation of Delaware
Filed Apr. 17, 1964, Ser. No. 360,543
7 Claims. (Cl. 239—127.3)

This invention relates generally to nozzles adapted to control the passage of gas and more particularly to nozzle assemblies for varying the effective area of the gas orifice.

The object of this invention is to provide a nozzle assembly which is variable in area including means for preventing the lateral escape of gases while maintaining a relatively smooth inner surface so as to minimize the generation of shock waves and prevent the increase of boundary layer thickness.

Another object of this invention is to provide a pressure-balanced self-regulating expansible nozzle assembly which is lightweight and therefore easily distorted and highly responsive to pressure changes.

A further object of this invention is to provide an expansible nozzle assembly having means to fluid cool the walls and actuating means to vary the nozzle area.

A still further object of this invention is to provide a fluid cooled expansible nozzle assembly which may define a non-linear contoured surface.

According to the present invention a nozzle assembly comprises an annular ring for mounting on one end of a tubular member to which is pivotally attached along the periphery of the ring, a plurality of finger-like control arms and a plurality of longitudinally extending cellular segments disposed the full length between the control arms and attached thereto providing an expansible connection between the control arms so that radial movement of the arms away from the nozzle longitudinal axis provides a greater nozzle area.

The present invention while developed in connection with jet engine exhaust orifices and exemplified herein as such should be understood to be equally applicable to use as an air inlet for jet aircraft, or other nozzle aplications.

Figure 1:
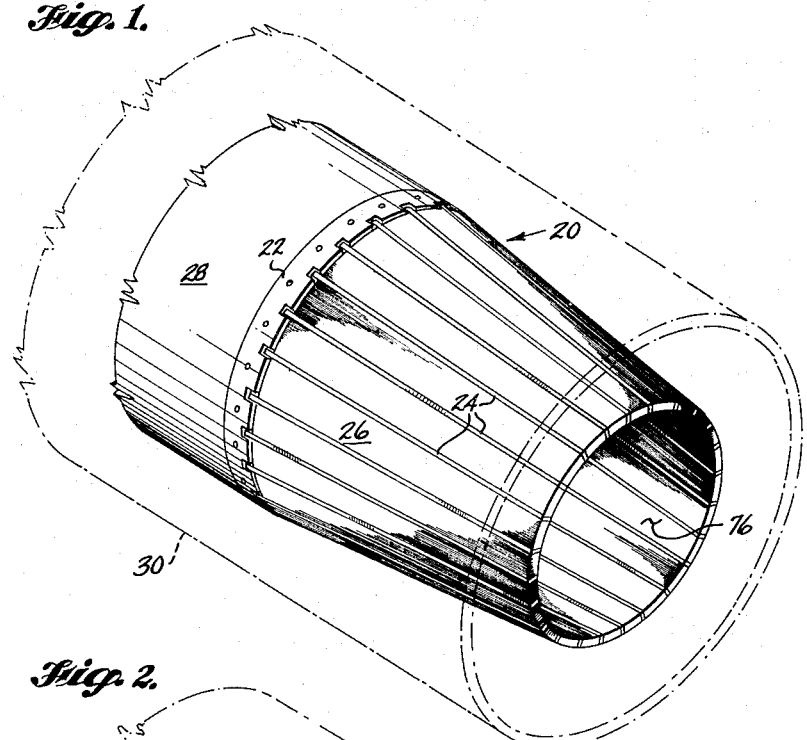
FIGURE 1 is a perspective view of an expansible nozzle shown in the unexpanded position.
Figure 2:
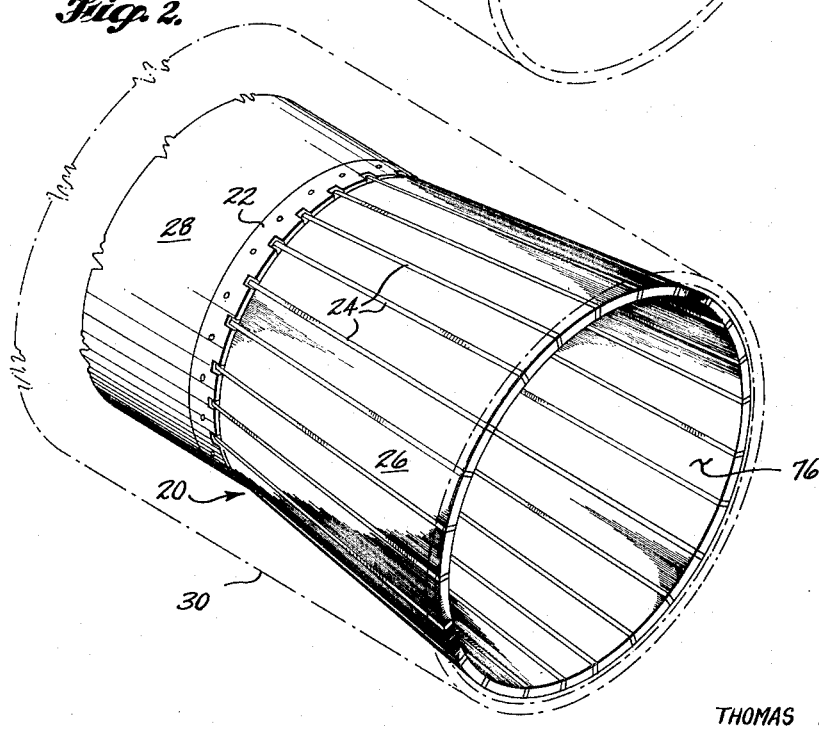
FIGURE 2 is a perspective view of the nozzle of FIGURE 1 shown in the expanded position.
Figure 3:
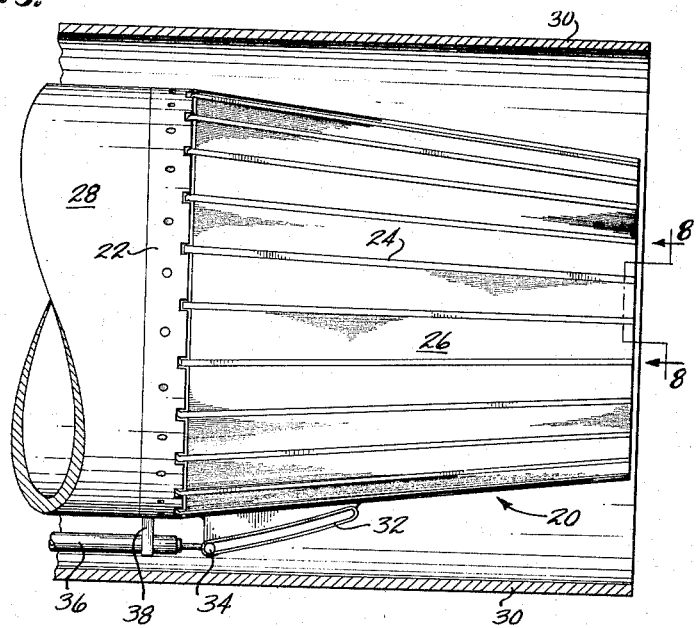
FIGURE 3 is a side elevation view of the nozzle of FIGURE 1 shown in the unexpanded position.

Referring now to FIGURES 1, 2, 3 and 4, there is shown an expansible nozzle 20 comprising an annular ring 22 to which are attached a plurality of finger-like control arms 24 and a plurality of longitudinally extending segments 26 secured between adjacent control arms 24. The nozzle 20 will be described herein in connection with a jet engine as the discharge orifice thereof. The annular ring 22 is connected to a tubular member or discharge end 28 of the jet engine. A shroud or outer annular member 30 is shown concentrically surrounding the nozzle 20. One embodiment of means to actuate the control arms 24 is shown in FIGURE 3 comprising a slotted track 32 fixedly mounted on one of the arms 24, a track follower 34, and an actuating cylinder 36 fixedly mounted through holder 38 to annular ring 22. While only one such actuator and roller-track mechanism is shown, it is to be understood that a plurality of such actuators may be disposed about the circumference of the annular ring 22.

Figure 5:
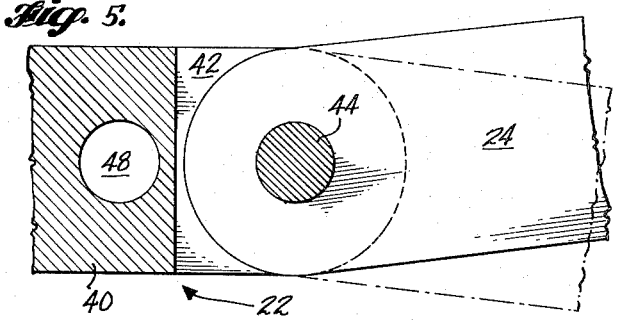
FIGURE 5 is section view of the annular ring shown in FIGURE 4.

In FIGURE 5, a detailed view of the connection between control arm 24 and annular ring 22 is shown. The annular ring 22 comprises a main body 40 and a plurality of hinge arms 42. Control arms 24 are disposed between adjacent hinge arms 42 and a hinge pin 44 is passed through the end of the control arms. The control arms 24, therefore, are hingedly connected to annular ring 22 allowing free movement in a radial direction.

Figure 6:
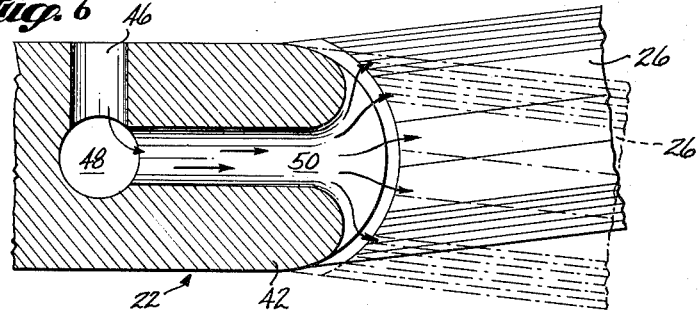
FIGURE 6 is a section view of another portion of the annular ring shown in FIGURE 4.
Figure 7:
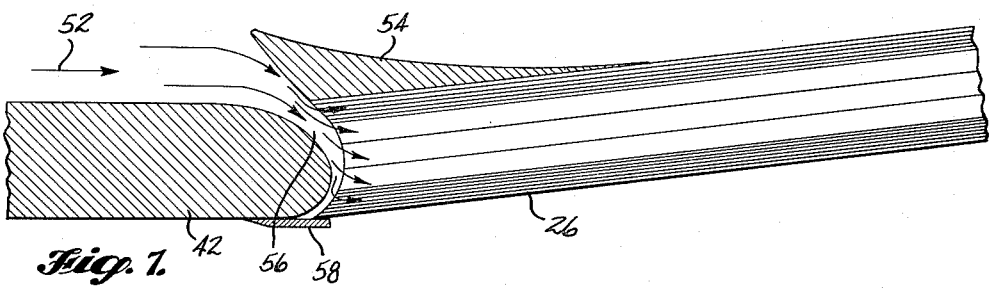
FIGURE 7 is a section of a modification of the annular ring and nozzle shown in FIGURE 4.

To cool the nozzle walls, a cooling fluid, such as a gas, may be introduced into the longitudinally extending cellular segments 26 adjacent the annular ring 22. One embodiment of a means for providing cooling fluid is shown in FIGURE 6. A series of radially oriented cooling intake orifices 46 are disposed along the periphery of the main body member 40. These intakes 46 interconnect the cooling medium within the shroud 30 with a manifold passage 48. A plurality of distribution passages 50, disposed within the annular ring hinge members 42, interconnect the manifold passage 48 with the inlet end of the longitudinally extending cellular segments 26. A second embodiment for introducing cooling fluid into the cellular segment 26 is shown in FIGURE 7. A projection 54 is mounted on the longitudinal segment 26 at the end nearest the annular ring 22 and extending into an air passage 52 between the shroud 30 and the expansible nozzle 20. For this embodiment airflow 52 is established within the shroud 30, for example, by bleeding off jet engine compressor air; the projection 54 then directs the airflow 52 into the intake end of the longitudinal cellular segments 26. It is to be understood that various gas supply sources may be used to provide the gas flow 52 which enters the manifold 48 or is directed by the projection 54 into the intake end of the longitudinal segments 26. In particular, the air intake 46 may be directly connected to a jet engine compressor bleed source or a ram pressure air supply which is created by the movement of the aircraft itself. To prevent high pressure air from within the nozzle from escaping through the passage 56, a flexible annular member, such as flat spring 58, is fixedly attached to annular ring 22. The cooling air 52 which passes through the longitudinal segment mixes with the nozzle internal gas flow at the trailing edge of the nozzle 20 and assists in noise suppression.

Figure 9:
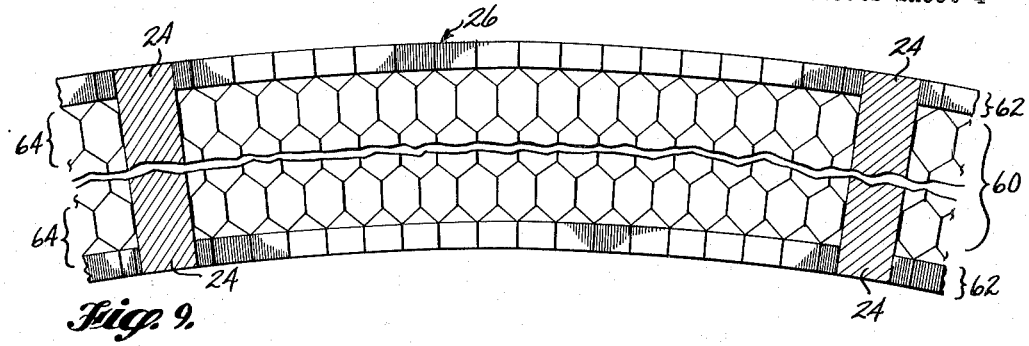
FIGURE 9 is a section view of a segment of the nozzle shown in FIGURE 4.
Figure 8:
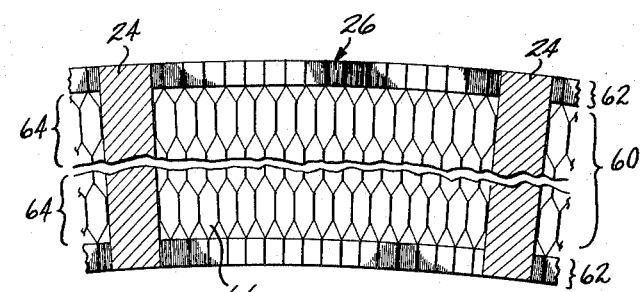
FIGURE 8 is a section view of a segment of the nozzle shown in FIGURE 3.

In FIGURES 8 and 9, a cross-section of one of the longitudinally extending segments 26 is shown comprising an "open-pack" cellular structure 60 surrounded by two "close-pack" cellular structures 62. The "open-pack" cellular structure 60 is comprised of a plurality of circumferential rows 64 of large sized cells 66; the rows are stacked in a radial direction. The large sized cells 66 are hexagonal in shape and may have sides of equal length or of varying length as shown in FIGURES 8 and 9. The cells are formed from flexible metallic heat-resistant sheets 68. The cellular structure is constructed by methods well known in the art wherein alternate flat metallic flexible sheets are adhered to one another after which the flat sheets may be expanded to form a cellular structure. The innermost and outermost rows of the large sized cells 66 are open on one end, such as cells 66a and 66b. Disposed within the portions of the sheet 68 which forms the radially oriented sides of the open hexagons 66a and 66b is the "close-pack" cellular structure 62.

Figures 10, 11:
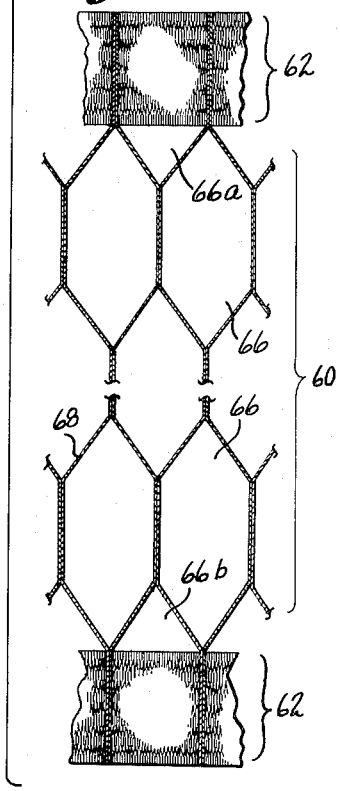
FIGURE 10 is an enlarged section view of a portion of the segment shown in FIGURE 8.
FIGURE 11 is an enlarged section view of a portion of the segment shown in FIGURE 10.
Figure 12:
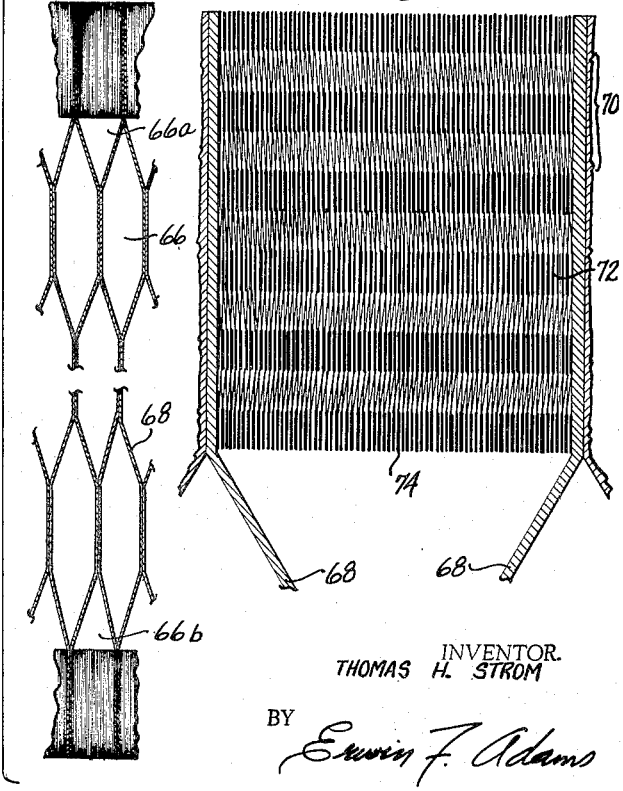
FIGURE 12 is a further enlarged section view of a portion of the segment shown in FIGURE 11.

The "close-pack" cellular structure 62 comprises a plurality of circumferential rows 70 as shown in FIGURE 12. Each row 70 comprises a multiplicity of small size cells 72; the rows are stacked in a radial direction. The cells 72 are formed by extremely lightweight flexible metallic sheets 74. This "close-pack" cellular structure is also constructed by methods well known in the art. The relative size of the small cells 72 and the large cells 66 may be seen best in FIGURE 10 through FIGURE 12. While this fairly represents the relative size of the cells, it should be understood that the thickness of the metallic sheet 68 relative to the thickness of the sheet 74 is exaggerated for purposes of illustration. Moreover, the relative size of the large cells and the small cells, as shown in the figures, is only a preferred embodiment which is well adapted to facilitate cooling of the expansible nozzle walls. The benefit derived from using circumferential rows of large sized cells in the center of the segments 26 and small sized cells for the innermost and outermost rows is that a cooling fluid may be more easily passed through large sized cells with less flow resistance, while the small cells expose a relatively smooth nozzle surface.

In operation, the expansible nozzle 20 has a variable exit area 76. The area 76 will increase as the circumference of this exit area is enlarged; for example, if the circumference is made twice as large, the area 76 will increase fourfold. To double the circumference, the circumferential rows 64 and 70 of the segments 26 must be expanded by approximately 100%. The cells are shown in the unexpanded position in FIGURE 10, and in FIGURE 11 are shown expanded aproximately 100% in the circumferential direction. With regard to the "close-pack" cellular structure 62, it should be appreciated from FIGURE 10, that the metallic sheets 74 in the unexpanded position are virtually in contact with another. In other words, in the unexpanded position there are no cells formed between the metallic sheets in the "close-pack" section 62 of the segments 26. A 100% circumferential expansion, therefore, will form cells 72 having a circumferential distance between the radially oriented sides equal only to the thickness of the sheets 74. Radial leakage of the gas within the nozzle 20 is primarily prevented by this "close-pack" cellular structure 62. The extremely small circumferential distance between the sheets 74, even in the expanded position, moreover, presents an internal nozzle surface which is essentially smooth. This smoothness constitutes one of the salient features of this nozzle construction, since no large deformation of the internal nozzle surface takes place when the area is expanded. In other words, the unexpanded nozzle inner surface is formed by the collapsed small-sized cells 72 which is a series of adjacently disposed portions of the metallic sheets 74. When the nozzle is expanded, no large gaps or discontinuities are formed between the sheets 74 but rather the distance between the sheet edges forms an opening which is only equivalent to the thickness of the sheets themselves. Since no shock producing projections are formed, no shock waves will be established due to the deformation of the nozzle surface and no turbulence or increase of gas boundary layer thickness will occur. Furthermore, since the deforming inner surface is a resilient heat resisting material, no provision is required for the combination of a surface member which expands exposing a gap containing the resilient member which must be coated with a heat resistant material, as are known in the prior art.

Figure 4:
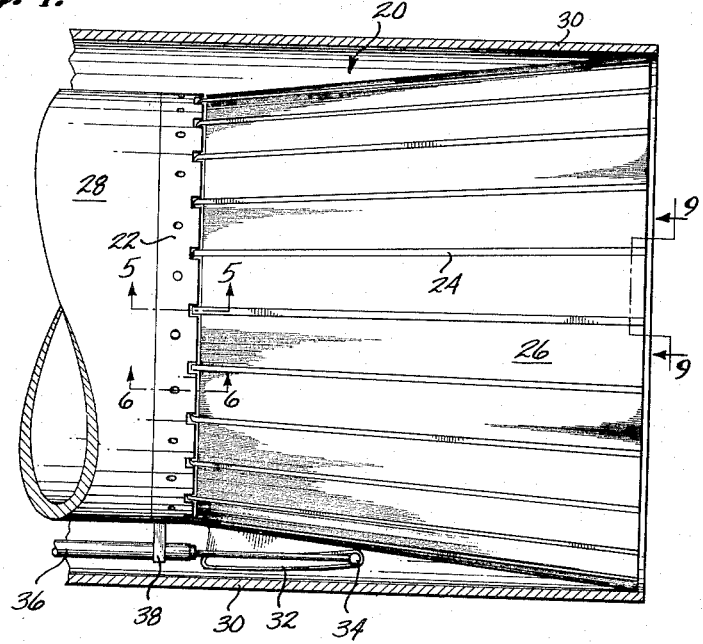
FIGURE 4 is a side elevation view of the nozzle of FIGURE 1 shown in the expanded position.

The actuation of the finger-like control arms 24 to increase the exit area 76 may be provided by various means. In FIGURES 3 and 4, there is shown a hydraulic actuator 36 mounted to annular ring 22 by means of a mounting 38 which operates the track-follower 34. A plurality of these actuators 36 may be disposed about the circumference of the annular ring 22 to provide a uniform actuation of the finger-like control arms 24, as previously mentioned. In FIGURES 1 and 2, no direct type of actuating device is shown. In this embodiment the control of the exit area 76 is provided by the differential gas pressure across the nozzle 20 walls. The differential pressure across the nozzle wall in this "free-floating" embodiment may be controlled by varying the pressure of the gas enclosed between the nozzle 20 and the shroud 30.

The present invention provides an expansible nozzle which may be increased in circumference with a minimum of friction between the expanding element while preventing the radial leakage of the gas flow through the nozzle. The slight deformation of the nozzle inner surface continuity prevents the formation of shock waves which create turbulence thereby impeding the internal nozzle flow.

While there has been shown and described the fundamental novel features of this invention as applied to the preferred embodiments, it will be understood that omissions, substitutions and changes in form in details of the device illustrated may be made by those skilled in the art without departing from the scope of the invention. It is the intention therefore to be limited only by the scope of the following claims and reasonable equivalents thereof.

I claim:
1. A nozzle assembly comprising:
   (a) an annular ring,
   (b) a plurality of finger-like control arms pivotally attached to said annular ring,
   (c) a plurality of longitudinally extending circumferential segments secured between adjacent control arms, each of said segments comprising a collapsible cellular structure having individual cells extending the full length of said longitudinal segments whereby radial movement of said control arms in a direction to increase the nozzle area causes said cellular structure to laterally expand thereby maintaining a substantially smooth nozzle inner surface and preventing radial leakage through said surface.

2. The nozzle assembly of claim 1 wherein each of said longitudinally extending segments comprises a plurality of circumferentially extending cellular rows arranged radially, each of said rows comprising a plurality of hexagonal-shaped cells, each of said cells having radially oriented sides and the adjacent cells having their radially oriented sides interconnected.

3. The nozzle assembly of claim 1 wherein each of said longitudinally extending segments comprises a plurality of large celled circumferentially extending rows arranged radially including a radially outermost row and a radially innermost row, each of the cells of said outermost and innermost rows being hexagonally-shaped and open on one end and having disposed therein a plurality of small celled circumferentially extending rows arranged radially, each of said small cells being hexagonally-shaped and having radially oriented sides, the adjacent cells in each row having radially oriented sides interconnected, and each of the small cells being entirely collapsed when said nozzle area is minimum and capable of expanding when said control-arms are radially moved away from the nozzle longitudinal axis.

4. The nozzle assembly of claim 3 additionally comprising means to radially move said control arms and said longitudinally extending cellular segments for varying the area of said nozzle.

5. The nozzle assembly of claim 4 wherein the longitudinally extending segments are tapered, the wider end of the segment being the pivoted end, and the smaller ends defining an area lesser than the area of said annular ring when the control arms are in their radially innermost position.

6. The nozzle assembly of claim 3 including means for providing cooling fluid to the pivotal end of said segments whereby fluid is passed through the large cells of said segments for cooling thereof.

7. A self-regulated variable area nozzle assembly comprising:
 (a) an annular ring,
 (b) a plurality of finger-like control arms pivotally attached to said annular ring,
 (c) a plurality of collapsible celled longitudinally extending segments, each of said segments having its edges secured to the edges of adjacent control arms so as to form a fluid-tight nozzle wall, said wall being radially movable and positioned by the pressure differential between the fluid within the nozzle and the external medium.

References Cited by the Examiner
UNITED STATES PATENTS

| | | | |
|---|---|---|---|
| 2,634,578 | 4/1953 | Kallal | 60—35.6 |
| 2,940,251 | 6/1960 | Prentiss | 60—35.6 |

MARK NEWMAN, *Primary Examiner.*